United States Patent [19]
Aromin

[11] Patent Number: 5,943,199
[45] Date of Patent: Aug. 24, 1999

[54] MINI APPLIANCE LEAKAGE CURRENT INTERRUPTER

[75] Inventor: Victor V. Aromin, West Warwick, R.I.

[73] Assignee: Tower Manufacturing Corporation

[21] Appl. No.: 08/837,739

[22] Filed: Apr. 22, 1997

[51] Int. Cl.[6] .................................................. H02H 3/16
[52] U.S. Cl. ............................................... 361/42; 361/45
[58] Field of Search ............................... 361/42–51, 792, 361/794, 795

[56] References Cited

U.S. PATENT DOCUMENTS

| | | | |
|---|---|---|---|
| 4,567,544 | 1/1986 | Ronemus et al. | 361/399 |
| 5,148,344 | 9/1992 | Rao et al. | 361/42 |
| 5,177,657 | 1/1993 | Baer et al. | 361/45 |
| 5,198,955 | 3/1993 | Willner | 361/42 |
| 5,270,896 | 12/1993 | McDonald | 361/45 |
| 5,341,266 | 8/1994 | Grove | 361/45 |
| 5,363,269 | 11/1994 | McDonald | 361/45 |
| 5,459,630 | 10/1995 | MacKenzie et al. | 361/45 |
| 5,513,076 | 4/1996 | Werther | 361/784 |
| 5,583,730 | 12/1996 | Gershen et al. | 361/50 |
| 5,644,464 | 7/1997 | Zhou | 361/115 |
| 5,661,623 | 8/1997 | McDonald et al. | 361/42 |
| 5,680,287 | 10/1997 | Gernhardt et al. | 361/42 |

*Primary Examiner*—Jeffrey Gaffin
*Assistant Examiner*—Kim Huynh
*Attorney, Agent, or Firm*—Kriegsman & Kriegsman

[57] ABSTRACT

A miniature appliance leakage current interrupter (ALCI) interrupts the flow of current through a pair of lines extending between a source of power and a load. The ALCI comprises a circuit breaker having a pair of normally closed switches, one switch being located in each of the pair of lines between the source of power and the load. The circuit breaker is connected to a relay circuit which selectively opens the pair of normally closed switches. The relay circuit is connected to a fault detection circuit which detects the presence of a ground fault condition in the pair of lines. When the ground fault condition detected exceeds a predetermined value, an integrated circuit chip in the fault detection circuit causes the relay circuit to open the circuit breaker. The ALCI further includes a single-sided circuit board which is housed within a generally rectangular plug. The circuit board has a first side and a second side, the second side having a pattern of conductive paths. The circuit components of the ALCI are mounted on the circuit board with the integrated circuit of the fault detection circuit surface mounted on the second side.

7 Claims, 8 Drawing Sheets

MINI APPLIANCE LEAKAGE CURRENT INTERRUPTER

BACKGROUND OF THE INVENTION

The present invention relates generally to ground fault safety devices and more specifically to appliance leakage current interrupters.

It is well known for electrical appliances, such as hair dryers, to draw electrical power through connection to a power source, such as an electrical outlet. Specifically, the electrical appliance (which serves as the load of the electrical system) is connected to the power source by a pair of current-carrying wires. The pair of current-carrying wires typically include a hot wire and a neutral wire, the pair of wires having equal but opposite magnitudes under normal conditions.

On occasion, the electrical system may experience a ground fault condition while the load is connected to the power supply. A ground fault condition occurs when the differential between the values of the currents of the two wires exceeds a predetermined value. Often a ground fault will occur if the hot line becomes inadvertently grounded. A ground fault condition can result in a loss of power to the electrical appliance because current is unable to flow to the load. As a consequence, an excessive amount of current tends to flow into the ground conductor of the electrical system which, in turn, creates dangerous voltage levels at points in the circuit that should be at ground potential. This condition can result in potentially dangerous electrical shocks, which could seriously injure an individual.

Accordingly, ground fault safety devices are commonly employed in such electrical systems to eliminate ground fault conditions. One type of ground fault safety device is the ground fault circuit interrupter (GFCI). Another type of ground fault safety device is the appliance leakage current interrupter (ALCI). Ground fault circuit interrupters are used to eliminate ground fault conditions as well as grounded neutral conditions, whereas appliance leakage current interrupter are used only to eliminate ground fault conditions. Both types of ground fault safety devices prevent ground fault conditions from occurring by opening the electric circuit upon the detection of a ground fault condition in the pair of wires.

It is known to incorporate GFCI's and ALCI's into electrical plugs, electrical switches and electrical receptacles.

U.S. Pat. No. 5,177,657 to M. Baer et al. discloses of a ground fault interrupter circuit with an electronic latch. The ground fault interrupter circuit interrupts the flow of current to a pair of lines extending between a source of power and a load. The ground fault interrupter circuit includes a circuit breaker comprising a normally open switch located in one or both of the lines, a relay circuit for selectively closing the normally open switch, an electronic latch circuit operable in first and second bi-stable states and a fault sensing circuit for sensing the presence of a fault condition in at least one of the lines. The electronic latch circuit causes the relay circuit to close the normally open switch and maintain the normally open switch in its closed position when the electronic latch circuit is in the first bi-stable state. The electronic latch circuit also causes the relay circuit to permit the normally open switch to return to its normally open condition when the latch circuit is in its second bi-stable state. A fault sensing circuit senses the presence of a fault condition in at least one of the lines and causes the electronic latch circuit to latch in its second state upon detection of the fault condition.

One well known and commonly used ALCI is made by Tower Manufacturing Corporation and is shown U.S. Design Pat. No. 356,066 to C. P Rao et al. This ALCI includes a fault detection circuit to detect the presence of a ground fault condition. The fault detection circuit includes a five layered transformer which monitors the current differential between the hot and neutral lines. The fault detection circuit also includes an integrated circuit (IC) chip which generates a output fault signal whenever the imbalance between the currents in the hot and neutral lines exceeds a predetermined value. The output fault signal is sent to a relay circuit which is coupled to a pair of switches, one switch being located in the hot line and one switch being located in the neutral line. When the magnitude of the output fault signal generated by the transformer exceeds a predetermined value, the IC chip applies power to the relay circuit which causes the pair of switches to open the hot and neutral lines. The IC chip used in the circuit is Raytheon Corporation chip number RV4145.

The circuit of the ALCI described above is mounted within a generally rectangular housing having a top, a bottom, a front end and a rear end. The housing is attached to the appliance by an electrical cord which extends into the housing from the rear end. A pair of prongs (blades) extend out from the bottom of the housing and are sized, shaped and spaced away from each other so that they can be inserted into the sockets of an electrical outlet, thus making contact and closing the circuit.

The circuit components of the above identified ALCI are typically through-hole mounted on one side of a single-sided circuit board which is positioned within the housing and all the conductive connection lines and pads are soldered on the other side of the circuit board. In particular, it should be noted that the IC chip is mounted on the first side of the circuit board through plated-through hole technology.

In U.S. Pat. No. 5,198,955 to Wilner, there is disclosed a miniature circuit interrupter for interruption of a primary circuit, the circuit interrupter formed or molded with a plug, connector or the like, the plug or connector being non-serviceable and the circuit interrupter therein being sealed and watertight.

Another patent of interest is U.S. Pat. No. 4,567,544 to Ronemus et al.

SUMMARY OF THE INVENTION

It is an object of this invention to provide a new and improved ALCI.

It is another object of this invention to provide an ALCI as described above wherein the circuitry of the ALCI is contained within a generally rectangular housing which is very small in size.

It is yet another object of this invention to provide an ALCI as described above for use with an appliance such as a hair dryer.

It is still another object of this invention to provide an ALCI as described above wherein the ALCI is constructed so as to also serve as a plug for connecting the appliance to an electrical outlet.

It is another object of this invention to provide an ALCI as described above which has a limited number of parts, which is easy to use and which is inexpensive to manufacture.

Accordingly, there is provided an appliance leakage current interrupter (ALCI) for interrupting the flow of current through a pair of lines extending between a source of power and a load, said appliance leakage current interrupter comprising a circuit breaker having a pair of normally closed switches, one switch being located in each of said lines between the source of power and the load, a relay circuit for selectively opening the pair of normally closed switches, a fault detection circuit for detecting the presence of a ground fault condition in said pair of lines and for causing said relay circuit to open said circuit breaker when said fault condition detected exceeds a predetermined value, said fault detection circuit comprising an integrated circuit chip and a transformer, and a single-sided circuit board having a first side and a second side, the second side having a pattern of conductive paths, wherein said integrated circuit chip is surface mounted on the second side of said single-sided circuit board.

According to one embodiment of the present invention, said appliance leakage current interrupter further comprises a pair of contact prongs and a housing, the housing having a top, a bottom, a front end and a rear end, the pair of prongs extending out from the front end of the housing.

According to another embodiment of the present invention, said appliance leakage current interrupter further comprises a pair of contacts prongs and a housing having a top, a bottom, a front end and a rear end, the pair of prongs extending out from the bottom of the housing.

Various other features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
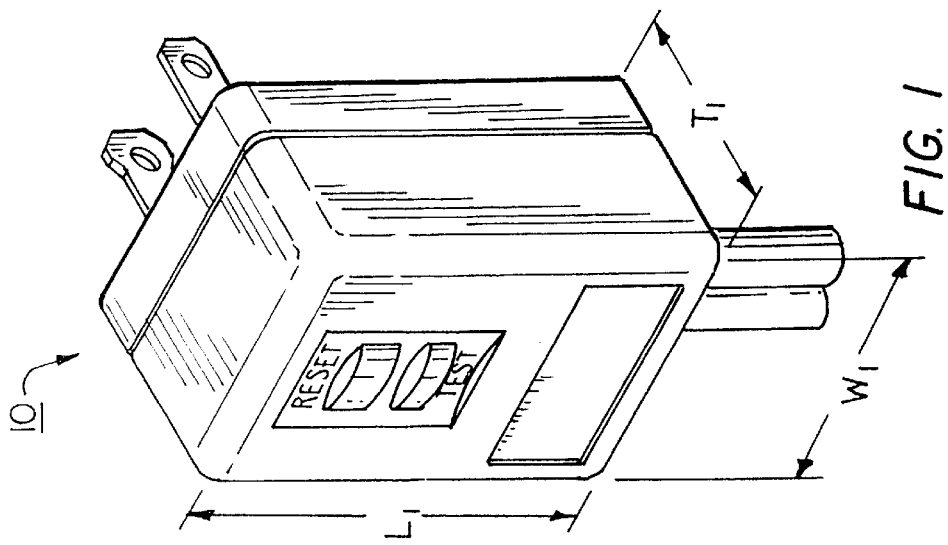
FIG. 1 is a perspective view of a prior art appliance leakage current interrupter.
Figure 2:
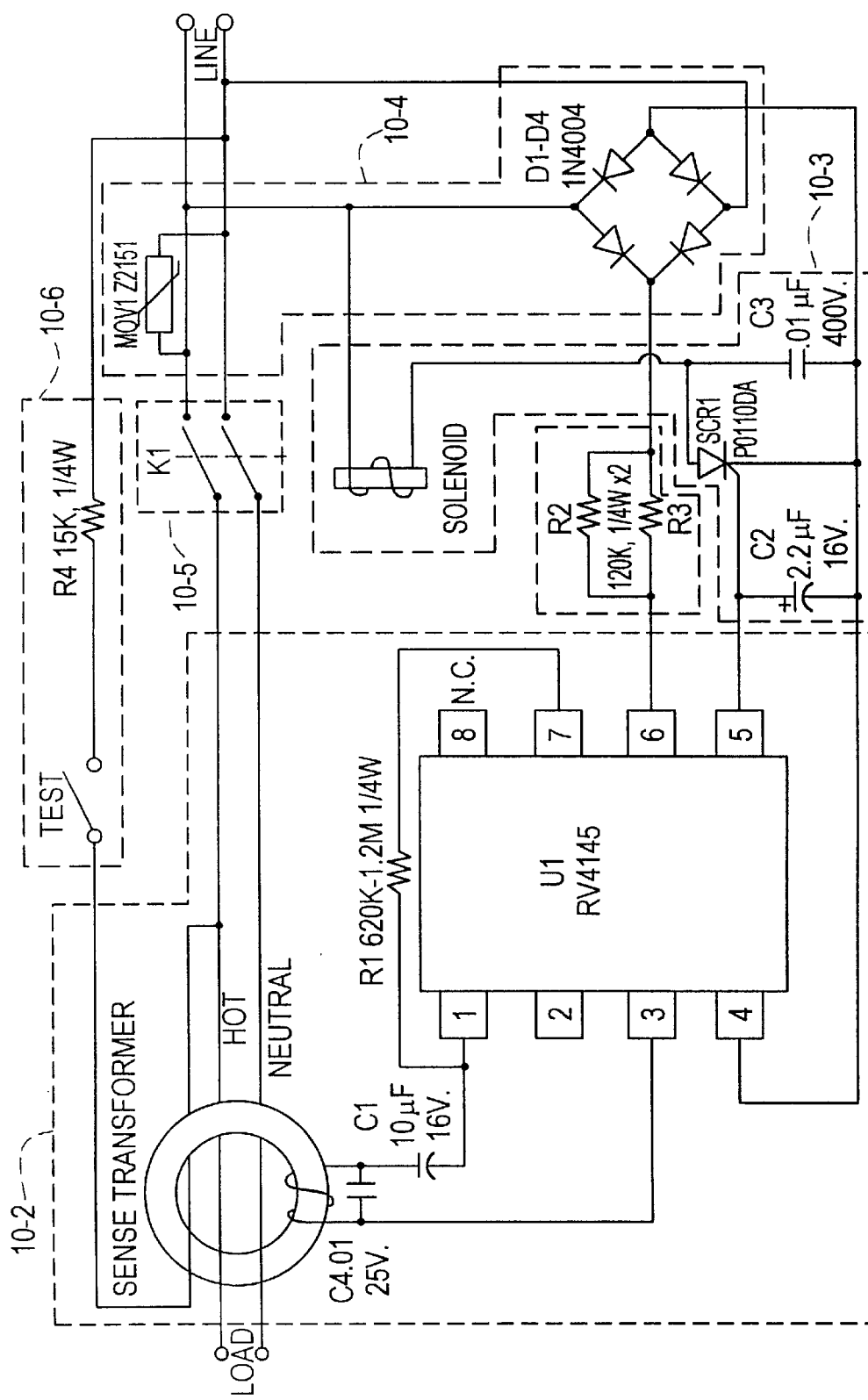
FIG. 2 is a circuit diagram of the prior art appliance leakage current interrupter shown in FIG. 1.
Figure 3:
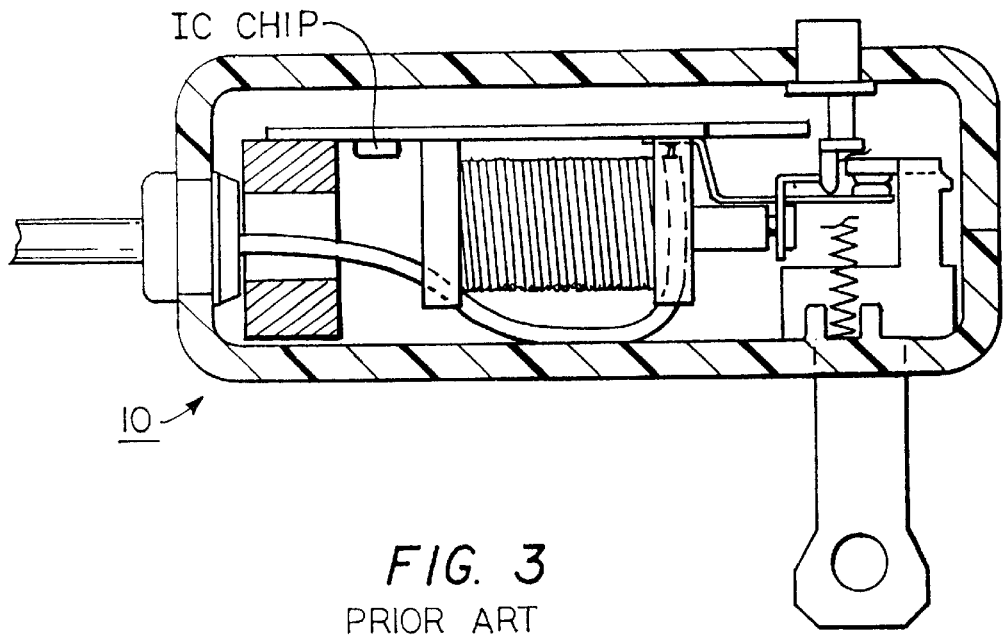
FIG. 3 is a side section view of the prior art appliance leakage current interrupter shown in FIG. 1.

FIGS. 1–3 show one type of prior art appliance leakage current interrupter (ALCI) which is well known in the art, the ALCI being identified by reference numeral 10. It is the function of ALCI 10 to detect and, if necessary, eliminate ground fault conditions. Appliance leakage current interrupter 10 is sold by Tower Manufacturing Corporation as model number SD1028, the design of which is represented in U.S. Design Pat. No. 356,066 which issued on Mar. 7, 1995 to C. P. Rao et al.

Circuitry 10-0 of ALCI 10 is mounted on a printed circuit board within a generally rectangular shaped housing 10-1 which serves as the electrical plug for an electrical appliance. Circuitry 10-0 includes a fault detection circuit 10-2, a relay circuit 10-3, a power supply circuit 10-4, a circuit breaker 10-5 and a test circuit 10-6. The housing of ALCI 10 has a length $L_1$ of approximately 2.20 inches, a width $W_1$ of approximately 1.95 inches and a thickness $T_1$ of approximately 1.95 inches. It should be noted that due to industry regulations, the size of the housing for the plug is deemed too large to safely accommodate electrical prongs which extend from the housing at 180 degrees from the electrical cord of the appliance, thereby limiting potential applications. The particular details of ALCI 10 will be discussed below only as they compare to the present invention.

Figure 4:
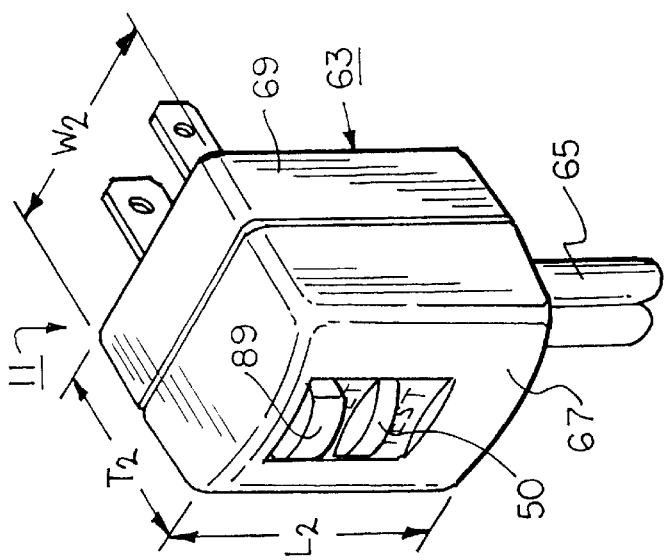
FIG. 4 is a perspective view of a first embodiment of a miniature appliance leakage current interrupter constructed in accordance with the principles of the present invention.
Figure 5:
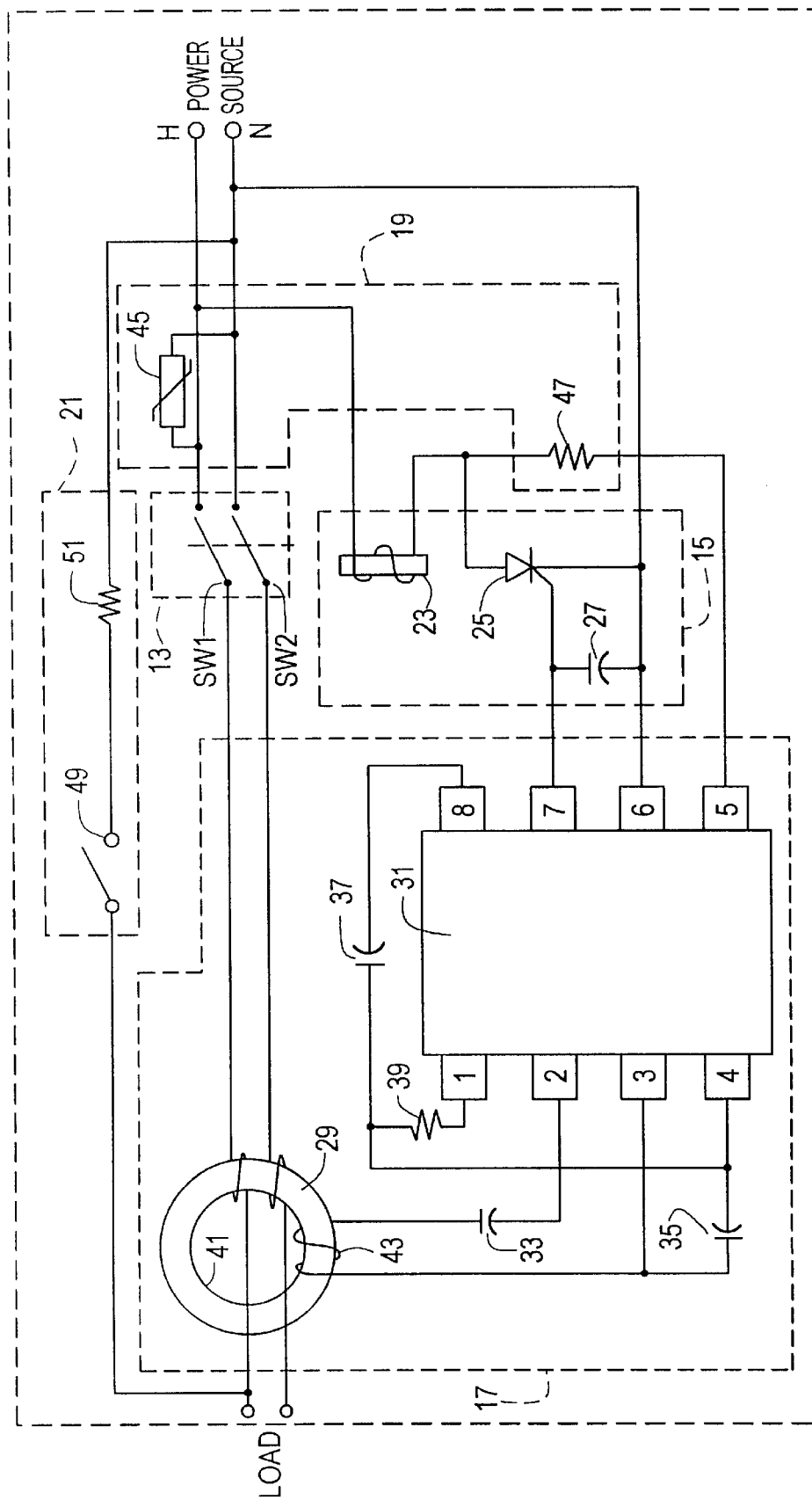
FIG. 5 is a circuit diagram of the miniature appliance leakage current interrupter shown in FIG. 4.

Referring now to FIGS. 4 through 8 and first to FIG. 5, there is shown a circuit diagram for a miniature appliance leakage current interrupter (ALCI) constructed in accordance with the principles of the present invention, the ALCI being designated as reference numeral 11. Appliance leakage current interrupter 11 includes a circuit breaker 13, a relay circuit 15, a fault detection circuit 17, a power supply circuit 19 and a test circuit 21.

Appliance leakage current interrupter 11 is electrically connected to the pair of current carrying wires which connect a load to a power source. The pair of current carrying wires include a hot line (or wire) H and a neutral line (or wire) N, lines H and N having equal but opposite magnitudes under normal conditions. It is the function of ALCI 11 to interrupt the flow of current through lines H and L upon detection of a ground fault condition, which will be discussed in detail below.

Circuit breaker 13 comprises a pair of normally closed switches SW1 and SW2 which are located in the hot and neutral lines, respectively, between the power source and the load. Switches SW1 and SW2 remain in the closed position until such time as fault detection circuit 17 detects the presence of a ground fault condition, at which time switches SW1 and SW2 open. Once open, switches SW1 and SW2 remain open until a reset button (to be discussed in detail below) is manually depressed to close the switches.

Relay circuit 15 comprises a solenoid 23, a silicon controlled rectifier (SCR) 25 and a capacitor 27. Solenoid 23 is connected to hot line H and serves the function of selectively opening switches SW1 and SW2 upon the detection of a ground fault condition. Rectifier 25 is connected to both solenoid 23 and fault detection circuit 17 and serves to energize solenoid 23 upon the detection of a ground fault condition. Rectifier 25 is preferably a model PO110DA rectifier sold by Tencor Corporation. Capacitor 27 is connected in parallel to rectifier 25 and fault detection circuit 17 and serves as a noise suppression filter. Capacitor 27 preferably has a value of 10 nf and acts to filter out noise occurring in circuit 11 which could mistakenly cause rectifier 25 to energize solenoid 23. It contrast to ALCI 11, ALCI 10 includes a pair of capacitors which are connected in parallel, the capacitors having values of 2.2 uf and 0.01 uf. Because the relay circuit of ALCI 11 includes one less capacitor than ALCI 10, ALCI 11 is able to be slightly reduced in size.

Fault detection circuit 17 comprises a transformer 29, an integrated circuit (IC) chip 31, a coupling capacitor 33, a noise filter capacitor 35, a timing capacitor 37 and a feedback resistor 39. It is the function of fault detection circuit 17 to detect the presence of a ground fault condition in the hot and neutral lines. Furthermore, upon the detection of a ground fault condition, fault detection circuit 17 generates an output signal which is applied to relay circuit 15 which opens circuit breaker 13.

Transformer 29 includes a laminated core 41 and a multiturn secondary sense winding 43. Laminated core 43 is generally ring shaped and includes three laminated layers or rings. In contrast, the laminated core of ALCI 10 includes five laminated layers; therefore, the transformer of ALCI 11 is substantially smaller than the transformer of ALCI 10. Hot wire H and neutral wire N serve as the primary winding and are wrapped around core 41 twice in order to build up the primary. In contrast, in ALCI 10, wires H and N are only wrapped around the core of the transformer once. Secondary winding 43 is connected to coupling capacitor 33 which, in turn is connected to pin 2 of IC chip 31. In addition, winding 43 is connected to pin 3 of chip 31 and noise filter capacitor 35 which, in turn, is connected to pin 4 of chip 31. It is the function of transformer 29 to sense current differentials between hot line H and neutral line N and induce an associated output to secondary winding 43. Coupling capacitor 33, which preferably has a value of 10 uf, serves to couple the AC signal of secondary winding 43 before the signal reaches chip 31. Noise filter capacitor 35, which preferably has a value of 0.1 uf, serves to filter out unwanted noise signals before such signals reach chip 31. Integrated circuit chip 31 is preferably an RV4140 model chip manufactured by Ratheon Corporation. In contrast, ALCI 10 uses IC chip model number RV4145, manufactured by Ratheon Corporation.

Pin 4 of chip 31 is connected to feedback resistor 39 which, in turn, is connected to pin 1 of chip 31. Pin 4 of chip 31 is also connected to timing capacitor 37 which, in turn, is connected to pin 8 of chip 31. Pins 6 and 7 of chip 31 are connected to capacitor 27 and rectifier 25. It is the function of ground fault interrupter IC chip 31 to amplify the ground fault signal generated by transformer 29 and provide an associated output signal at pin 7. Feedback resistor 39, which preferably has a value between 100K ohms and 470K ohms, serves to establish the minimum threshold value of a ground fault condition which will cause an output ground fault signal at pin 7 to pass to relay circuit 15. Timing capacitor 37, which preferably has a value of 0.02 uf, serves to work in conjunction with feedback resistor 39 in determining the minimum ground fault current setting.

Power supply circuit 19 comprises a metal oxide varistor 45 and a voltage dropping resistor 47. It is the function of power supply circuit 19 to supply the AC power produced from the power source to pin 5 (the power supply pin) of chip 31. Varistor 45, which preferably has a value of 150 volts, serves to provide voltage surge suppression for circuit 11 from the power source. Resistor 47, which preferably has a value of 82K ohms, serves to supply the appropriate AC voltage required by IC chip 31. In contrast, ALCI 10 includes a rectifier bridge rather than a voltage dropping resistor. The elimination of the rectifier bridge enables the overall size of ALCI 11 to be slightly smaller than ALCI 10.

Test circuit 21 comprises a test switch 49 and a current limiting resistor 51. It is the function of test circuit 21 to provide a means for testing if appliance leakage current interrupter 11 is functioning properly. Test switch 49, which is preferably a normally open, single pole single throw switch, serves to energize the test circuit when in the closed position. Test switch 49 is opened and closed through the depression of a manually operated button 50. Resistor 51, which preferably has a value of 15K ohms, serves to provide a simulated fault current to test circuit 21, similar to a fault condition which would be detected by fault detection circuit 17.

In use, appliance leakage current interrupter 11 detects ground fault conditions. Specifically, ground fault conditions result when the differential in the currents in the hot and neutral lines exceeds a predetermined value. For example, a ground fault condition may result from an accidental grounding of the hot line. Ground fault conditions can lead to excessive current flow which can cause dangerous voltages to be present at points that should be ground potential, which can be extremely dangerous. Fault detection circuit 17 detects the presence of a ground fault condition and generates a ground fault condition output signal which is applied to relay circuit 15. In turn, relay circuit 15 serves to open up circuit breaker 13 which opens circuit 11, thereby preventing further ground fault current to flow.

Figure 6:
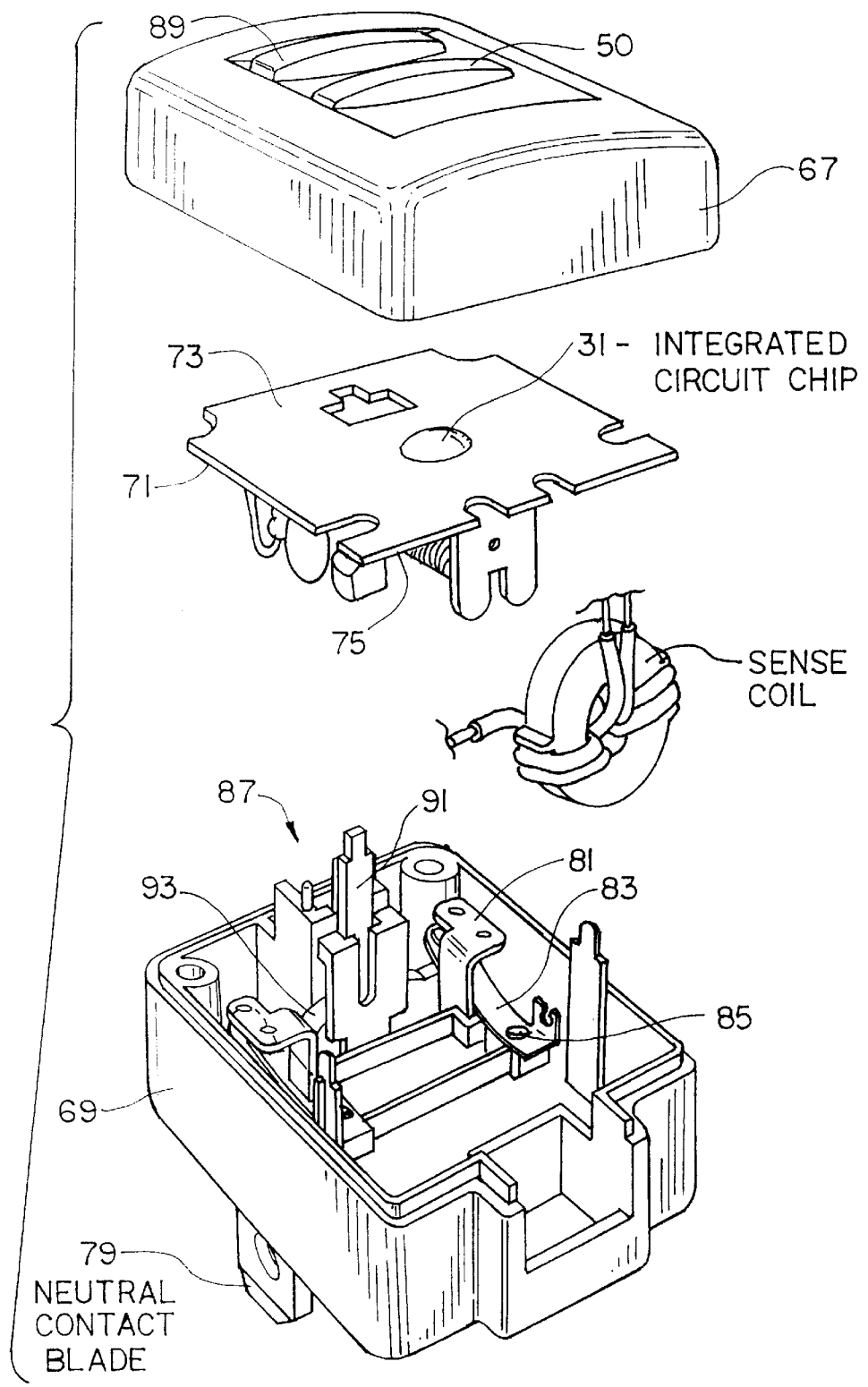
FIG. 6 is a top exploded view of the miniature appliance leakage current interrupter shown in FIG. 4.
Figure 7:
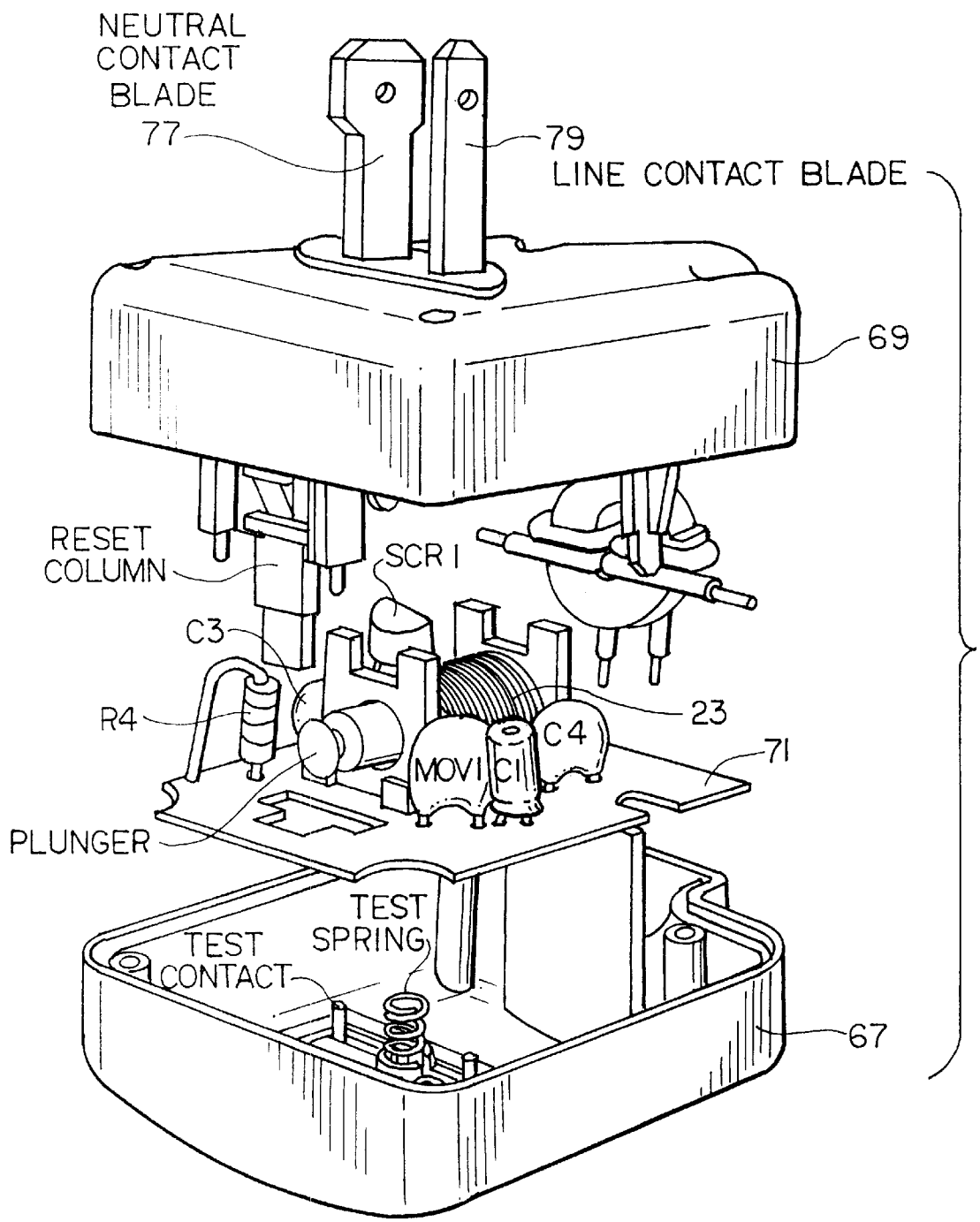
FIG. 7 is a bottom exploded view of the miniature appliance leakage current interrupter shown in FIG. 4.

As shown in FIGS. 4, 6 and 7, ALCI 11 further includes a rectangular-shaped housing 63 which is mounted onto an end of an electrical cord 65 which is connected to the load. Housing 63 includes a top portion 67 and a bottom portion 69. Top and bottom portions 67 and 69 are secured together by screws (not shown).

A single-side circuit board 71 is mounted within housing 63. The components of the electric circuit of ALCI 11 are mounted on circuit board 71 so as to facilitate the connection of the components and so as to reduce the overall size of the unit. Circuit board 71 comprises a top (i.e. solder) side surface 73 and a bottom side surface 75. The majority of the components of ALCI 11 are mounted on bottom side 75 and extend through plated-through holes in board 71. The components are then soldered and interconnected through conductive paths and patterns which are located on top side 73.

Figure 8:
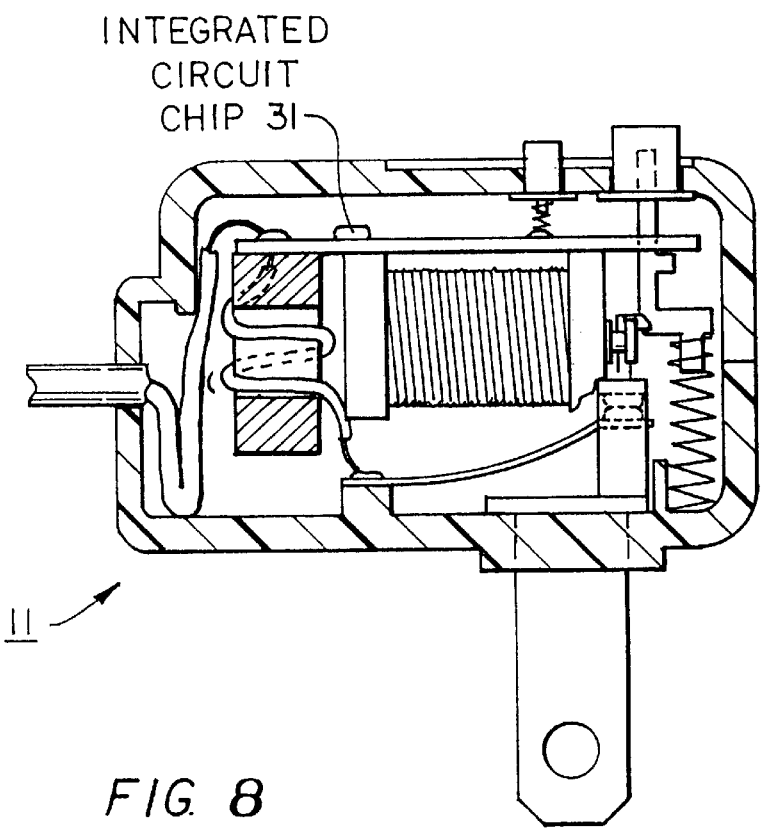
FIG. 8 is a side section view of the miniature appliance leakage current interrupter shown in FIG. 4.

It should be noted that IC chip 31 is mounted on top side 73 of circuit board 71. In contrast, in ALCI 10 the IC chip is mounted on the bottom side. By mounting IC chip 31 on top side 73, the density of components which are mountable on circuit board 71 is increased, thereby reducing the overall size of plug 61. Referring now to FIGS. 3 and 8, it can be seen that by placing of chip 31 on top side 73 rather than bottom side 75, transformer 29 and solenoid 23 are capable of being positioned closer to one another than in ALCI 10, thereby making ALCI 11 substantially shorter in length than ALCI 10. With the IC chip on the bottom side as in ALCI 10, the IC chip, the transformer and the solenoid must all be adequately spaced apart, which dramatically increases the overall length of the plug. It should also be noted that IC chip 31 is shown as being surface mounted on side 73. If desired, however, IC chip 31 could be mounted on side 73 of board 71 by wires and solder.

ALCI 11 also includes a prong assembly 77 for connecting the electrical components of ALCI 11 to a power supply. Referring to FIGS. 6 and 7, prong assembly 77 includes a pair of neutral contact prongs (or blades) 79 which are sized and shaped so as to be fitted within the sockets of an electrical outlet. Prongs 79 extend from within housing 63 and out through bottom portion 69 at an angle of 90 degrees from the longitudinal axis of electrical cord 65. Each prong 79 is connected to a conductive bracket arm 81. Each bracket arm 81 is positioned above a conductive contact arm 83. Contact arms 83 are mounted within housing 63 such that each arm 83 pivots about a pin 85 so as to selectively contact bracket arm 81. Each contact arm 81 is connected to the circuit of ALCI 11 and, as a consequence, when contact arm 83 is pivoted out of contact from bracket arm 81, power is not supplied ALCI 11.

ALCI 11 includes a reset assembly 87 which serves to reset ALCI 11 after the detection of a ground fault condition. Reset assembly 87 comprises a reset button 89, which like test button 50, extends out through top portion 67 of housing 63. Depression of reset knob 81 causes a springed reset column 91 to move downward. Downward movement of column 91 causes an actuator 93 to pivot each of contact arms 83 out of contact from bracket arm 81. This creates an open connection in housing 63 which consequently prevents power from being supplied to ALCI 11. As soon as the reset button 89 is released, power is returned to ALCI 11 and circuit breaker 13 is closed.

As a result of the numerous changes made in ALCI 10 to presently form ALCI 11, the size of housing 63 of ALCI 11 has been considerably reduced. Specifically, housing 63 has a length $L_2$ of approximately 1.5 inches, a width $W_2$ of approximately 1.35 inches and a thickness $T_2$ of approximately 1.05 inches.

As can be appreciated, ALCI 11 as so constructed, also serves as a plug which can be connected to an electrical outlet.

Figure 9:
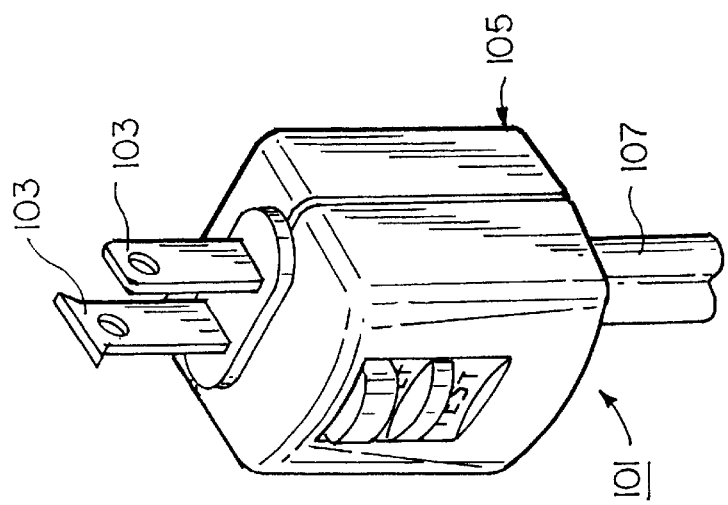
FIG. 9 is a perspective view of a second embodiment of a miniature appliance leakage current interrupter.
Figure 10:
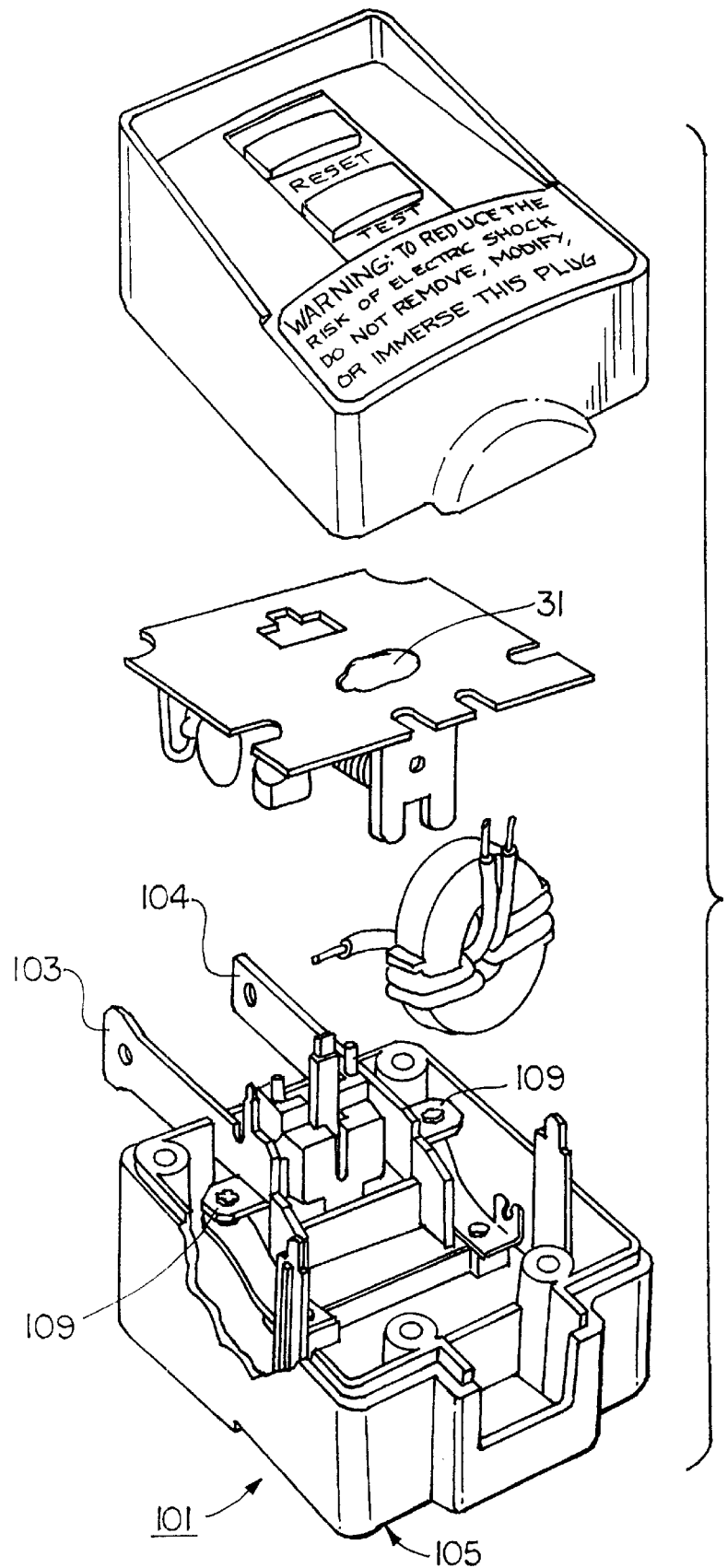
FIG. 10 is a top exploded view of the miniature appliance leakage current interrupter shown in FIG. 9.
Figure 11:
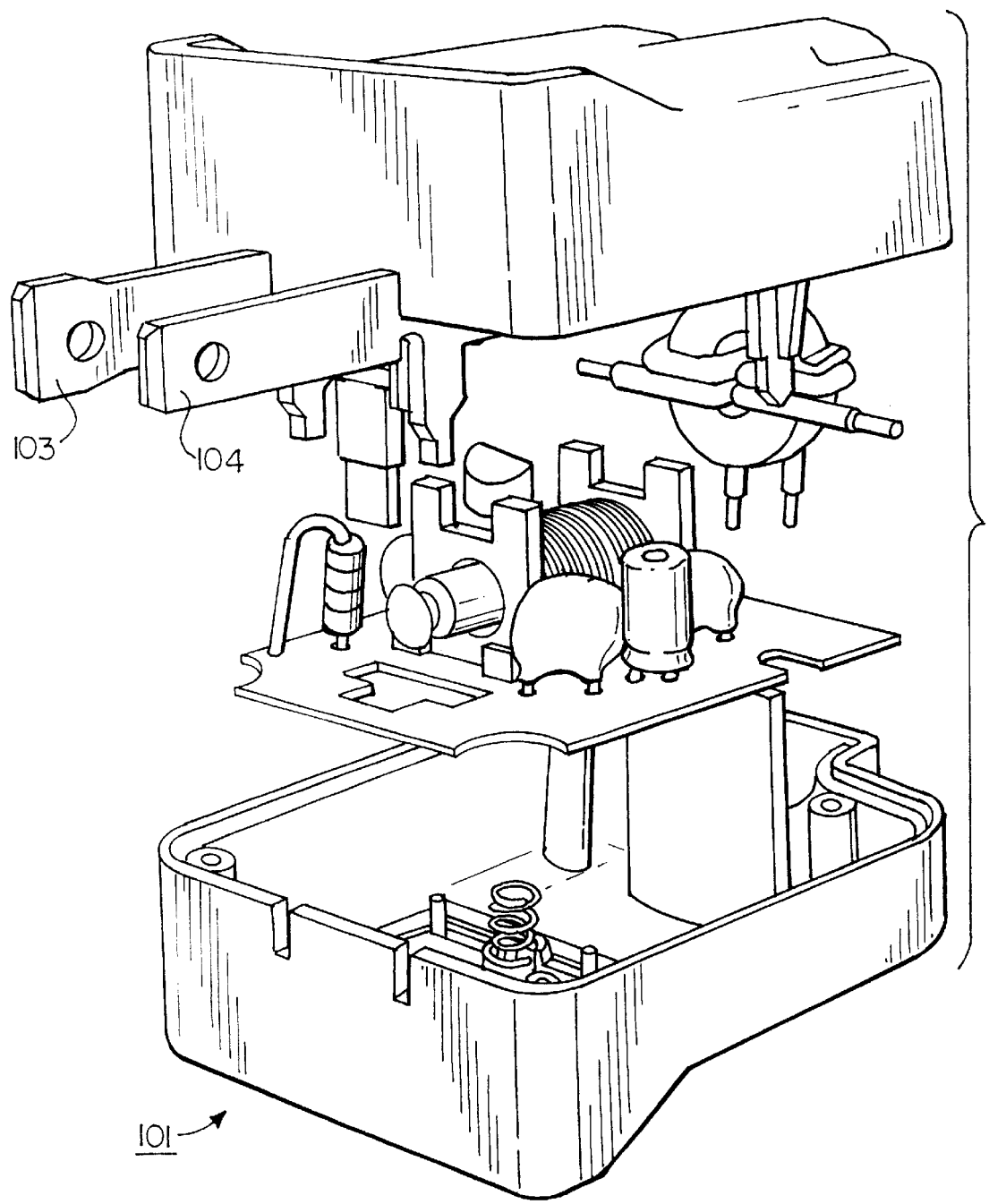
FIG. 11 is a bottom exploded view of the miniature appliance leakage current interrupter shown in FIG. 9.

Referring to FIGS. 9–11, there is shown a second embodiment for an appliance leakage current interrupter constructed in accordance with the principles of the present invention, the ALCI being designated as reference numeral 101. ALCI 101 is similar in construction to ALCI 11 except that prongs 79 in ALCI 11 extend out from housing 63 at an angle of 90 degrees from the longitudinal axis of the cord whereas in ALCI 101, prongs 103 and 104 extend out from housing 105 at an angle of 180 degrees from the longitudinal axis of electrical cord 107. Furthermore, the size and shape of pair of bracket arms 109 have been slightly altered to accommodate the change in the position of prongs 103 relative to housing 105. It should be noted that the considerable reduction in the size of housing 105 enables ALCI to be safely constructed either with the prongs extending out at an angle of 90 degrees (as shown in FIG. 4) or 180 degrees (as shown in FIG. 9) from the longitudinal axis of the cord.

The embodiments shown of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An appliance leakage current interrupter (ALCI) for interrupting the flow of current through a pair of lines extending between a source of power and a load, said appliance leakage current interrupter comprising:

a. a circuit breaker having a pair of normally closed switches, one switch being located in each of said lines between the source of power and the load;
   b. a relay circuit for selectively opening the pair of normally closed switches;
   c. a fault detection circuit for detecting the presence of a ground fault condition in said pair of lines and for causing said relay circuit to open said circuit breaker when said fault condition detected exceeds a predetermined value, said fault detection circuit comprising an integrated circuit chip and a transformer; and
   d. a single-sided circuit board, said single-sided circuit board having a bottom surface and a top surface, the top surface having a pattern of conductive paths;
   e. wherein said integrated circuit chip is mounted on the top surface of said single-sided circuit board and wherein said relay circuit and said transformer are mounted on the bottom surface of said single-sided circuit board.

2. The appliance leakage current interrupter as claimed in claim 1 wherein said transformer includes a common core having three laminated layers, a primary winding and a secondary winding, said pair of lines serving as the primary winding for the transformer, each of said pair of lines being wrapped twice around the core of said transformer.

3. The appliance leakage current interrupter as claimed in claim 2 further comprising a generally rectangular-shaped housing, said housing being mounted on an end of an electrical cord connected to the load, said electrical cord having a longitudinal axis.

4. The appliance leakage current interrupter as claimed in claim 3 further comprising a prong assembly for supplying power from the source of power to the remainder of said appliance leakage current interrupter, said prong assembly comprising:

a) a pair of contact prongs which extend through said housing;
   b) a pair of conductive bracket arms positioned within said housing, each bracket arm being in contact with an associated contact prong; and
   c) a pair of conductive contact arms pivotally mounted within said housing, each contact arm capable of selective contact with an associated bracket arm, said contact arms being connected to the remainder of said appliance leakage current interrupter such that only when each contact arm is in contact with its associated bracket arm, power is supplied to said appliance leakage current interrupter.

5. The appliance leakage current interrupter as claimed in claim 4 wherein said pair of prongs extend out from said housing at an angle of 180 degrees from the longitudinal axis of the cord.

6. The appliance leakage current interrupter as claimed in claim 1 wherein said integrated circuit chip is surface mounted on the second side of said single-sided circuit board.

7. An appliance leakage current interrupter (ALCI) for interrupting the flow of current through a pair of lines extending between a source of power and a load, said appliance leakage current interrupter comprising:

a. a circuit breaker having a pair of normally closed switches, one switch being located in each of said lines between the source of power and the load;
   b. a relay circuit for selectively opening the pair of normally closed switches;
   c. a fault detection circuit for detecting the presence of a ground fault condition in said pair of lines and for causing said relay circuit to open said circuit breaker when said fault condition detected exceeds a predetermined value, said fault detection circuit comprising an integrated circuit chip and a transformer;
   d. a single-sided circuit board having a bottom surface and a top surface, the top surface having a pattern of conductive paths;

e. said integrated circuit chip being mounted on the top surface of said single-sided circuit board and said relay circuit and transformer being mounted on said bottom surface, said transformer including a common core having three laminated layers, a primary winding and a secondary winding, said pair of lines serving as the primary winding for the transformer, each of said pair of lines being wrapped twice around the core of said transformer;

f. a generally rectangular-shaped housing, said housing being mounted on an end of an electrical cord connected to the load, said electrical cord having a longitudinal axis;

g. a prong assembly for supplying power form the source of power to the remainder of said appliance leakage current interrupter, said prong assembly comprising:
  i. a pair of contact prongs which extend through said housing;
  ii. a pair of conductive bracket arms positioned within said housing, each bracket arm being in contact with an associated contact prong; and
  iii. a pair of conductive contact arms pivotally mounted within said housing, each contact arm capable of selective contact with an associated bracket arm, said contact arms being connected to the remainder of said appliance leakage current interrupter such that only when each contact arm is in contact with its associated bracket arm, power is supplied to said appliance leakage current interrupter;
  iv. said pair of prongs extend out from said housing at an angle of 90 degrees from the longitudinal axis of the cord;

h. a power supply circuit for providing alternating current to the integrated circuit chip, said power supply circuit comprising a metal oxide varistor for providing surge suppression from the source of power and a voltage dropping resistor for supplying the appropriate alternating current voltage that is required by the integrated circuit chip;

i. a test circuit for testing whether said appliance leakage current interrupter is properly functioning;

j. said relay circuit comprising a solenoid for selectively opening the pair of switches and a rectifier for energizing the solenoid upon detection of a ground fault condition; and k. a reset assembly for resetting said appliance leakage current interrupter after detection of a ground fault condition, said reset assembly being capable of pivoting each of the contact arms out of contact form its associated bracket arm to create an open connection, thereby preventing power from being supplied to said appliance leakage current interrupter.

* * * * *

(12) EX PARTE REEXAMINATION CERTIFICATE (7021st)
United States Patent
Aromin

(10) Number: US 5,943,199 C1
(45) Certificate Issued: Aug. 25, 2009

(54) MINI APPLIANCE LEAKAGE CURRENT INTERRUPTER

(75) Inventor: Victor V. Aromin, West Warwick, RI (US)

(73) Assignee: Tower Manufacturing Corporation, Providence, RI (US)

Reexamination Request:
No. 90/008,267, Oct. 6, 2006

Reexamination Certificate for:
Patent No.: 5,943,199
Issued: Aug. 24, 1999
Appl. No.: 08/837,739
Filed: Apr. 22, 1997

(51) Int. Cl.
*H01H 83/00* (2006.01)
*H01H 83/04* (2006.01)
*H01R 13/70* (2006.01)
*H01R 13/713* (2006.01)
*H01R 13/66* (2006.01)
H02H 3/32 (2006.01)
H02H 3/33 (2006.01)

(52) U.S. Cl. .......................................... 361/42; 361/45
(58) Field of Classification Search ............ 439/11, 439/31; 361/42
See application file for complete search history.

(56) References Cited

U.S. PATENT DOCUMENTS

| | | | | |
|---|---|---|---|---|
| 5,177,657 A | * | 1/1993 | Baer et al. | 361/45 |
| 5,249,970 A | * | 10/1993 | Jennings | 439/31 |
| 5,406,436 A | | 4/1995 | Doyle et al. | |
| 5,513,076 A | * | 4/1996 | Werther | 361/784 |
| 5,661,623 A | * | 8/1997 | McDonald et al. | 361/42 |

| | | |
|---|---|---|
| 5,943,199 A | 8/1999 | Aromin |

OTHER PUBLICATIONS

Raytheon Semiconductor, 1994 Databook, 1993, 3-823—3-828, Raytheon Company Semiconductor Division, U.S.A.
Vern Solberg, Design Guidelines for Surface Mount Technology, 1990, 1-19 & 77-81, Tab Books, Inc., Blue Ridge Summit, Pennsylvania.
Howard H. Manko, Soldering Handbook for Printed Circuits and Surface Mounting, 1986, 169-218, Van Nostrand Reinhold Company, Inc., New York, New York.

* cited by examiner

*Primary Examiner*—Sam Rimell

(57) ABSTRACT

A miniature appliance leakage current interrupter (ALCI) interrupts the flow of current through a pair of lines extending between a source of power and a load. The ALCI comprises a circuit breaker having a pair of normally closed switches, one switch being located in each of the pair of lines between the source of power and the load. The circuit breaker is connected to a relay circuit which selectively opens the pair of normally closed switches. The relay circuit is connected to a fault detection circuit which detects the presence of a ground fault condition in the pair of lines. When the ground fault condition detected exceeds a predetermined value, an integrated circuit chip in the fault detection circuit causes the relay circuit to open the circuit breaker. The ALCI further includes a single-sided circuit board which is housed within a generally rectangular plug. The circuit board has a first side and a second side, the second side having a pattern of conductive paths. The circuit components of the ALCI are mounted on the circuit board with the integrated circuit of the fault detection circuit surface mounted on the second side.

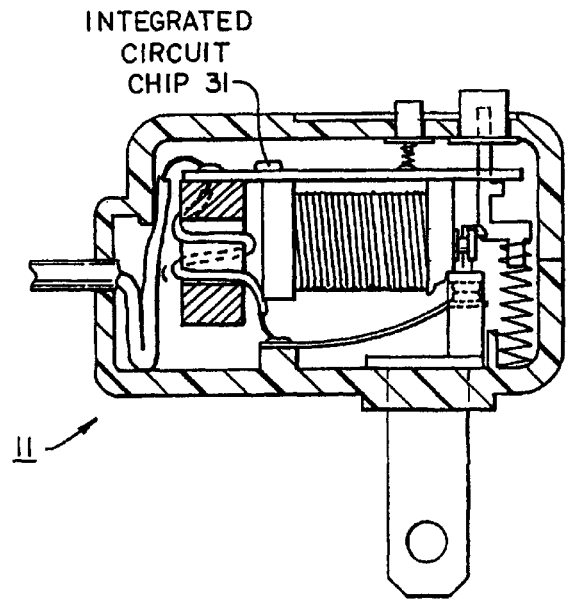

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2–3 are cancelled.

Claims 1 and 4–7 are determined to be patentable as amended.

1. An appliance leakage current interrupter (ALCI) for interrupting the flow of current through a pair of lines extending between a source of power and a load, *said pair of lines consisting of a hot line and a neutral line,* said appliance leakage current interrupter comprising:
   a. a circuit breaker having a pair of normally closed switches, one switch being located in each of said lines between the source of power and the load;
   b. a relay circuit for selectively opening the pair of normally closed switches, *said relay circuit including a solenoid*;
   c. a fault detection circuit for detecting the presence of a ground fault condition in said pair of lines and for causing said relay circuit to open said circuit breaker when said fault condition detected exceeds a predetermined value, said fault detection circuit comprising an integrated circuit chip and a transformer, *said transformer including a common core having three laminated layers, a primary winding and a multi-turn secondary winding, said hot and neutral lines extending between the source of power and the load serving as the primary winding for the transformer, each line of said hot and neutral lines of the primary winding being wrapped twice around the core of said transformer*; [and]
   d. a single-sided circuit board, said single-sided circuit board having a bottom surface and a top surface, the top surface having a pattern of conductive paths;
   e. [wherein] said integrated circuit chip [is] *being* mounted on the top surface of said single-sided circuit board and [wherein] said [relay circuit] *solenoid* and said transformer [being] *are* mounted on the bottom surface of said single-sided circuit board; *and*
   *f. a generally rectangular-shaped housing, said housing being mounted on an end of an electrical cord connected to the load, said housing having a length of approximately 1.5 inches, a width of approximately 1.35 inches and a thickness of approximately 1.05 inches, said electrical cord having a longitudinal axis, said circuit breaker, said relay circuit, said fault detection circuit and said single-sided circuit board all being disposed inside said generally rectangular-shaped housing.*

4. The appliance leakage current interrupter as claimed in claim [3] *1* further comprising a prong assembly for supplying power from the source of power to the remainder of said appliance leakage current interrupter, said prong assembly comprising:
   [a)] a. a pair of contact prongs which extend *out* through said housing;
   [b)] b. a pair of conductive bracket arms positioned within said housing, each bracket arm being in contact with an associated contact prong; and
   [c)] c. a pair of conductive contact arms pivotally mounted within said housing, each contact arm capable of selective contact with an associated bracket arm, said contact arms being connected to the remainder of said appliance leakage current interrupter such that only when each contact arm is in contact with its associated bracket arm, power is supplied to said appliance leakage current interrupter.

5. The appliance leakage current interrupter as claimed in claim 4 wherein said pair of prongs *are fixedly mounted relative to the housing and* extend out from said housing *opposite the cord* at an angle of 180 degrees from the longitudinal axis of the cord *and in alignment with the electrical cord*.

6. The appliance leakage current interrupter as claimed in claim 1 wherein said integrated circuit chip is surface mounted on the [second side] *top surface* of said single-sided circuit board.

7. An appliance leakage current interrupter (ALCI) for interrupting the flow of current through a pair of lines extending between a source of power and a load, *said pair of lines consisting of a hot line and a neutral line,* said appliance leakage current interrupter comprising:
   a. a circuit breaker having a pair of normally closed switches, one switch being located in each of said lines between the source of power and the load;
   b. a relay circuit for selectively opening the pair of normally closed switches;
   c. a fault detection circuit for detecting the presence of a ground fault condition in said pair of lines and for causing said relay circuit to open said circuit breaker when said fault condition detected exceeds a predetermined value, said fault detection circuit comprising an integrated circuit chip, *a coupling capacitor, a noise filter capacitor, a timing capacitor, a feedback resistor* and a transformer;
   d. a single-sided circuit board having a bottom surface and a top surface, the top surface having a pattern of conductive paths;
   e. said integrated circuit chip being mounted on the top surface of said single-sided circuit board and said relay circuit and *said* transformer being mounted on said bottom surface *of said single sided circuit board*, said transformer including a common core having three laminated layers, a primary winding and a *multi-turn* secondary winding, said [pair of] hot and neutral lines *extending between the source of power and the load* serving as the primary winding for the transformer, each of said pair of lines *serving as the primary winding* being wrapped twice around the core of said transformer;
   f. a generally rectangular-shaped housing *having a length of approximately 1.5 inches, a width of approximately 1.35 inches and a thickness of approximately 1.05 inches*, said housing being mounted on an end of an electrical cord connected to the load, said electrical cord having a longitudinal axis;
   g. a prong assembly for supplying power form the source of power to the remainder of said appliance leakage current interrupter, said prong assembly comprising:
      i. a pair of contact prongs which extend [through] *from within* said housing;

ii. a pair of conductive bracket arms positioned within said housing, each bracket arm being in contact with an associated contact prong; and iii. a pair of conductive contact arms pivotally mounted within said housing, each contact arm capable of selective contact with an associated bracket arm, said contact arms being connected to the remainder of said appliance leakage current interrupter such that only when each contact arm is in contact with its asscociated bracket arm, power is supplied to said appliance leakage current interrupter;

iv. said pair of prongs [extend out from] *extending from within* said housing at an angle of 90 degrees from the longitudinal axis of the cord;

h. a power supply circuit for providing alternating current to the integrated circuit chip, said power supply circuit comprising a metal oxide varistor for providing surge suppression from the source of power and a voltage dropping resistor for supplying the appropriate alternating current voltage that is required by the integrated circuit chip;

i. a test circuit for testing whether said appliance leakage current interrupter is properly functioning;

j. said relay circuit comprising a solenoid for selectively opening the pair of switches and a rectifier for energizing the solenoid upon detection of a ground fault condition; and k. a reset assembly for resetting said appliance leakage current interrupter after detection of a ground fault condition, said reset assembly being capable of pivoting each of the contact arms out of contact froms its associated bracket arm to create an open connection, thereby preventing power from being supplied to said appliance leakage current interrupter.

\* \* \* \* \*